March 10, 1953 — J. H. STARR — 2,631,069
FERTILIZER DISTRIBUTOR BEARING
Filed April 18, 1947 — 2 SHEETS—SHEET 1

INVENTOR
John H. Starr
BY
ATTORNEYS

March 10, 1953   J. H. STARR   2,631,069
FERTILIZER DISTRIBUTOR BEARING
Filed April 18, 1947   2 SHEETS—SHEET 2
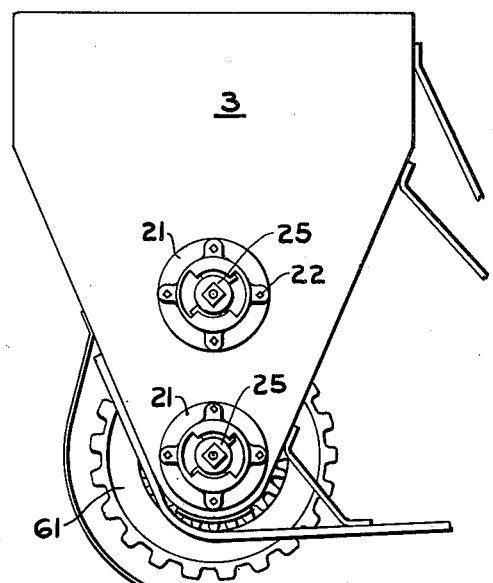
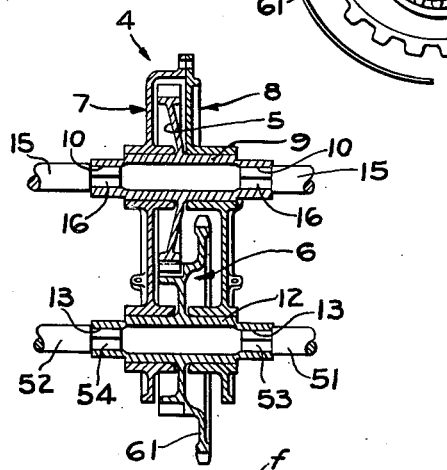
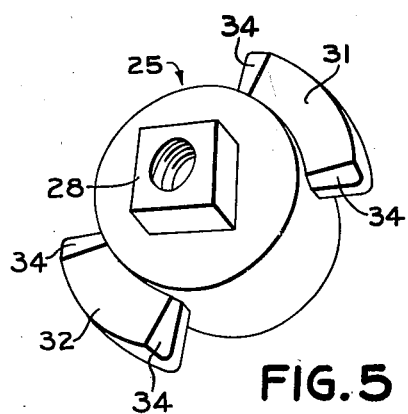
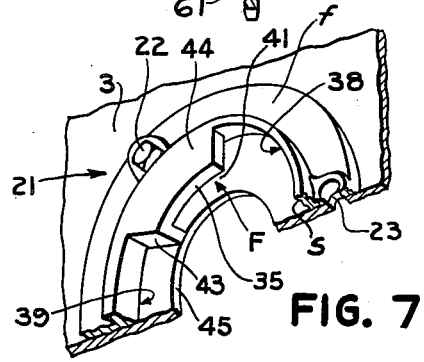
INVENTOR
John H. Starr
BY
ATTORNEYS Patented Mar. 10, 1953

2,631,069

UNITED STATES PATENT OFFICE 2,631,069

FERTILIZER DISTRIBUTOR BEARING

John H. Starr, Mayville, Wis., assignor to John Deere Van Brunt Company, a corporation of Wisconsin Application April 18, 1947, Serial No. 742,486

4 Claims. (Cl. 308—22)

The present invention relates generally to agricultural machines and more particularly to machines for distributing materials, such as fertilizer or the like.

The object and general nature of the present invention is the provision of a new and improved fertilizer distributor, and more particularly it is a feature of this invention to provide new and improved means for mounting the feed and/or agitator shafts in the material hopper with provisions for their ready removal for cleaning and other purposes.

More particularly, it is a feature of this invention to provide a new and improved bearing construction whereby the operation of removing the shaft from the hopper is materially facilitated.

These and other objects and advantages of the present invention will be apparent to those skilled in the art after a consideration of the following detailed description, in which:

Figure 2 is an end view of the hopper showing the quick detachable bearing construction forming the principal subject matter of the present invention.

Figure 5 is a perspective view of the detachable bearing member.

Figure 6 is a transverse vertical section, looking rearwardly, taken through the centrally located shaft-driving unit, showing details of the drive gearing.

Figure 7 is a fragmentary perspective view of the stationary part of applicant's new bearing.

Figures 1, 3, 4:
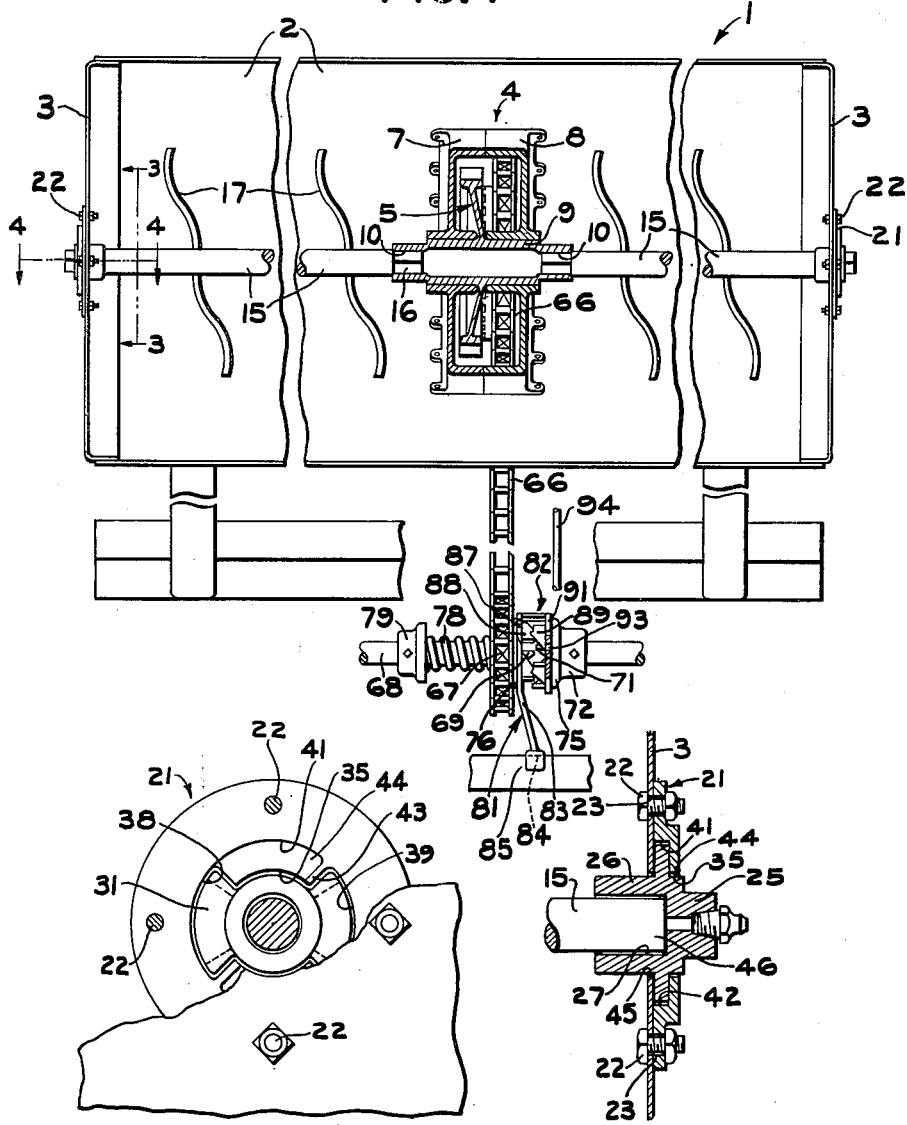
Figure 1 is a plan view looking downwardly into a material dispensing hopper in which the principles of the present invention have been incorporated.
Figure 3 is a sectional view taken generally along the line 3—3 of Figure 1 with certain parts broken away so as to show the construction more clearly.
Figure 4 is a sectional view taken generally along the line 4—4 of Figure 1.

Referring first to Figures 1 and 2, the reference numeral 1 indicates a fertilizer attachment for distributing fertilizer generally rearwardly of an agricultural implement that supports the attachment, such as, for example, a field cultivator. Briefly, the fertilizer distributor 1 comprises a hopper 2 having end walls 3 and a central casing section 4 in which a pair of driving members 5 and 6 are mounted for rotation. The casing section 4 preferably is made up of two mating sections 7 and 8. The two driving members 5 and 6 have gear teeth and are in mesh whereby when the gear member 6 is driven, both gears are rotated. The means for driving the gears will be described later. The upper gear 5 includes a hub section 9 having a pair of axially outwardly facing shaft-receiving sockets 10, preferably polygonal in cross section. The lower gear member 6 is of similar construction, also having a hub section 12 and a pair of axially outwardly facing shaft-receiving sockets 13. Each of the gears 5 and 6 is mounted for rotation in the casing 4 by means of bearing sockets receiving the respective hub sections 9 and 12, and the two casing parts 7 and 8 are connected together in any suitable way and mounted by any suitable means in the lower central portion of the hopper 2.

For the purpose of illustrating the principles of the present invention I have shown a pair of agitator shafts 15 removably mounted in the hopper 2. Preferably, the inner end of each shaft 15 is provided with a polygonal section 16 that is adapted to be inserted axially into the socket 10 for establishing a driving connection between the shaft 15 and the gear 5. The shaft 15 carries agitators 17 of any suitable form and/or construction.

The bearing construction receiving the outer end of the shafts 15 is of particular form and arrangement, and will now be described.

The bearing construction for the outer end of each shaft 15 comprises a member in the form of an outer ring or support 21 that is adapted to be fixed to the hopper end 3 in any suitable way, as by a plurality of bolts 22 extending through apertures in a radially outwardly extending circumferentially complete flange $f$ formed on the ring or fixed part 21 and through registering apertures 23 (Figure 7) in the hopper end wall 3. The inner bearing part or shaft receiving member is indicated in its entirety by the reference numeral 25 and comprises a hub or sleeve section 26 which is formed with a closed socket 27 and carries a laterally outer wrench-receiving polygonal boss 28 and a pair of generally oppositely disposed attaching or locking lugs 31 and 32. Each edge of the two lugs 31 and 32 is beveled, as indicated at 34, and in the preferred form of the invention, the socket 27 is circular in section in order to rotatably receive the outer end of the shaft 15.

The fixed part of the bearing construction, as indicated at 21, has a short cylindrical section $s$ and radially inwardly extending circumferentially spaced apart lugs 44, referred to later in detail, the inner edges 35 of which lie generally in a circle the diameter of which is about the same as the diameter of the hub portion 26 of the removable bearing part 25. Adjacent to and joining the central opening 35 in the fixed bearing part 21, the latter has a pair of oppositely arranged through openings 38 and 39 having the configuration of the attaching lugs 31 and 32, whereby the member 25 may be moved into and out of place in the bearing section 21. The latter member is also provided with a pair of lug-receiving recesses 41 and 42, each of which is formed by a stop wall 43 and a web section 44. The inner faces of the sections 44 are spaced from the inner face (F, Figure 7) of the hopper end wall 3, when the member 21 is bolted thereto, a distance which is the same as the thickness of the associated lug, 31 or 32, so that when the removable bearing member 25 is mounted in position, with the lugs 31 and 32 in the recesses 41 and 42, the lugs lie in the recesses with a snug fit. Since the members 21 and 25 are preferably castings, the engaging surfaces have sufficient roughness so that there is little tendency for the detachable bearing section to become loosened and disconnected from the fixed bearing part 21.

In operation, when it is desired to install the agitator shaft 15, the bearing member 25 is removed, if it is not already removed, and the shaft 15 let down into the hopper 2 and the end 16 inserted axially into the shaft-receiving socket 10 on the hub of the gear member 5. To facilitate this action, the hopper end wall 3 is apertured, as at 45, so that the outer end of the shaft 15 may first be inserted from the inside of the hopper wall 3 outwardly through the opening 45 so that the end 16 of the shaft 15 may be brought into a position in front of the socket 10, whereupon the shaft 15 may then be shifted axially inwardly, seating the shaft section 16 in the socket 10 and thereby establishing a driving connection between these parts. The length of the shaft 15 is preferably such that the outer end, indicated at 46 in Figure 4, extends closely adjacent the hopper end wall 3. Lastly the detachable bearing member 25 is brought into position, as by inserting the socket end portion 26 through the opening 45 in the hopper wall 3, thus applying the detachable bearing member 25 over the outer end 46 of the shaft 15, holding the bearing member 25 in such a position that the lugs 31 and 32 pass into the openings 38 and 39, after which the bearing member 25 may be turned, as by applying a wrench or the like to the polygonal boss 28, so as to carry the lugs 31 and 32 into the recess 41 and 42, bringing the lugs up against the stop walls 43. As mentioned above, the thickness of the lugs on the detachable bearing member and the depth of the recesses 41 and 42 are the same, and this size-for-size fit on the two casting members provides a tight fit which prevents the bearing from rotating backwards in case the direction of rotation of the shaft 15 should be reversed. Right hand and left hand bearing members 29 may be provided for the opposite ends of the hopper, where necessary. In Figure 3, the normal direction of rotation is counterclockwise, and while any suitable drive mechanism may be provided to drive the shafts 15, according to the principles of the present invention the shaft driving mechanism employed is one incorporating ratchet means arranged so that it is ordinarily impossible to drive the shafts 15 in a reverse direction. The mechanism, whereby the shafts 15 are driven in one direction but cannot ordinarily be driven in the other direction, will be described below.

In order to take out the shaft 15 from the hopper 2, as for cleaning or other purposes, all that is necessary to do is to apply a wrench to the lug 28, turn the bearing member 25 until the lugs 31 and 32 enter the openings 38 and 39 so that the bearing member 25 may be entirely disengaged from the fixed bearing part 21 on the hopper. The shaft 15 may then be removed from the hopper by first sliding the same generally axially outwardly a distance sufficient to release the inner end 16 from the socket section 7 on the gear 5 receiving it, and then bodily lifting the shaft out of the hopper.

Either of the distributor shafts 15 may be installed or removed, as indicated above, as desired. In most cases the fertilizer attachment will also include a feed shaft, and according to the principles of the present invention the feed shaft may be formed in two sections 51 and 52. These sections have inner squared ends 53 and 54 that are detachably insertable into the sockets 13 of the lower gear member 6. The outer ends of the feed shaft sections 51 and 52 are carried by bearing constructions exactly like that described above, and hence further description is believed to be unnecessary.

It will be noted that the movable inner bearing part 25 is held in position when it is rotated in one direction against a fixed stop in the socket sections of the fixed bearing or outer ring member 21, but may be freed therefrom by rotation in the other direction. According to the principles of the present invention, the bearing constructions are arranged right and left hand in order that they may be mounted on the hopper ends 3 in such manner that the normal direction of rotation of the associated shafts is such that the rotation of the shafts tends to keep or retain the inner bearing members 25 in position. Since the agitator shafts 15 are rotated in a direction opposite to that in which the feed shaft sections 51 and 52 are rotated, each hopper end will therefore have a right hand bearing unit and a left hand bearing unit. While ordinarily the inner bearing member fits with sufficient snugness in the outer bearing member so that momentary reversal of the shafts would not be sufficient to loosen the inner bearing members, according to the principles of the present invention, I prefer to provide a drive for the shafts so arranged that the drive is transmitted through ratchet mechanism that positively drives the shafts in only one direction, the ratchet mechanism ratcheting if, for example, the implement be backed which, without such ratchet mechanism, would drive the shafts backwardly and might under certain conditions tend to cause the removable bearing members to loosen.

Referring now to Figure 6, which shows one way of driving the agitator and feed shafts, it will be seen that I have provided a sprocket section 61 as an integral part of the lower gear member 6. A chain 66 is trained around the sprocket section 61 and at its lower end is trained over a sprocket 67 (Figure 1) that is loosely mounted on a jackshaft 68 supported by a frame of the implement and driven in any suitable way, such as a drive to one or more of the ground wheels. The sprocket gear 67 includes a set of angled ratchet teeth 69 which are adapted to mesh with a companion set of angled ratchet teeth 71 formed on a collar 72 fixed in any suitable way, as by a key or the like, to the shaft 68. The collar 72 is provided with a shouldered flange 75 and a similar shouldered section 76 is formed on the sprocket member 67. A pair of cooperating clutch throwout cams are disposed between the two shouldered sections 75 and 76 and one is moved relative to the other for controlling engagement and disengagement of the ratchet teeth 69 and 71. A biasing spring 78 is disposed between the sprocket 67 and a collar 79 that is fixed to the shaft 68.

The two controlling clutch throwout cams are indicated by the reference numerals 81 and 82. The cam member 81 is a stationary cam and includes an arm 83 having a notched portion 84 engageable with a flange of one of the frame angles, as shown at 85. The stationary cam member 81 also includes a ring section 87 which encircles the inner portion of the sprocket member 67, and the ring portion 87 is provided with cam sections 88 that cooperate with similar cam sections 89 formed on the ring portion 91 of the controlling cam member 82. The latter member includes an apertured arm section 93 which receives a link 94 or other suitable connection leading to an operative part of the implement, such as the rockshaft that raises and lowers the tools. The cooperating cam sections 88 and 89 are arranged so that, when the control member 94 is moved in one direction, the clutch members 67 and 72 are permitted to engage, thus transmitting the drive from the shaft 68 to the gear 6, such drive being transmitted through ratchet teeth, whereby if the implement should be backed, the teeth 69 and 71 will merely ratchet over one another and will not drive the agitator and feed shafts in a backward direction. When the control member 94 is rocked in the other direction, as when the tools are raised, the clutch members 67 and 72 are separated so as to interrupt the drive to the agitator and feed shafts.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. The combination of a support, a rotatable shaft movable about an axis, a bearing for said shaft, means for detachably mounting said bearing on said support for rotary movement in one direction about said axis, whereby the bearing is disconnectible from said support by a rotary movement in said direction, and a one-way driving mechanism connected to rotate said shaft about said axis only in the other direction.

2. In an apparatus for distributing material, a hopper, a shaft therein, a first bearing member receiving one end of said shaft by generally axial movement of said shaft toward said member, a second bearing member receiving the other end of said shaft, means for detachably mounting said second bearing member on said hopper so that said second bearing member is disconnectible therefrom by rotational movement in one direction and generally axial movement of said second bearing member away from said hopper, means acting between said hopper and said second bearing member for limiting rotation of the latter relative to said hopper in a direction opposite to said one direction, and means for driving said shaft in said opposite direction and including ratchet-like means adapted to overrun said shaft in the said one direction.

3. A two-part bearing construction for a shaft or the like, comprising a shaft-receiving member having a pair of radially outwardly extending attaching lugs having appreciable circumferential extent at their outer end portions, and a support receiving said member and comprising a part having a radially outwardly extending circumferentially complete attaching flange, a cylindrical portion of relatively short axial extent connected with the radially inner portions of said flange, radially inwardly extending circumferentially spaced apart lugs lying in a plane generally parallel to but spaced axially from said flange, the space between adjacent edges of said lugs being substantially equal to the circumferential dimension of said radially outwardly extending attaching lugs on said shaft-receiving member, whereby the latter may be pased into position whereby turning said shaft-receiving member brings said attaching lugs beneath said radially inwardly extending lugs, and a stop section connected to one radial edge of each of said radially inwardly extending lugs, each of said stop sections extending axially to substantially the plane of said attaching flange.

4. A bearing construction as defined in claim 3, further characterized by the opposite radially extending edges of the attaching lugs on said shaft-receiving member being beveled to facilitate passage of said attaching lugs into position behind said radially inwardly extending lugs.

JOHN H. STARR.

REFERENCES CITED

The following references are of record in the file of this patent:

UNITED STATES PATENTS

| Number | Name | Date |
|---|---|---|
| 750,463 | Kessler | Jan. 26, 1904 |
| 1,390,343 | Disbrow | Sept. 13, 1921 |
| 1,770,437 | Simpson | July 15, 1930 |
| 2,258,519 | Schumacher | Oct. 7, 1941 |
| 2,291,809 | Jackson | Aug. 4, 1942 |
| 2,409,463 | Ahrndt | Oct. 15, 1946 |
| 2,537,946 | Lindner | Jan. 16, 1951 |